United States Patent [19]
Roy

[11] Patent Number: 6,026,080
[45] Date of Patent: Feb. 15, 2000

[54] METHOD FOR PROVIDING ENHANCED H.321-BASED MULTIMEDIA CONFERENCING SERVICES OVER THE ATM WIDE AREA NETWORK

[75] Inventor: Radhika R. Roy, Howell, N.J.

[73] Assignee: AT&T Corporation, New York, N.Y.

[21] Appl. No.: 08/841,057

[22] Filed: Apr. 29, 1997

[51] Int. Cl.[7] .............................. H04L 12/16; H04J 3/16
[52] U.S. Cl. ........................................... 370/260; 370/469
[58] Field of Search ................................ 370/394, 505, 370/465, 395, 260, 259, 469, 473, 474, 352

[56] References Cited

U.S. PATENT DOCUMENTS

| | | | |
|---|---|---|---|
| 4,764,919 | 8/1988 | Hunter et al. ............................ | 370/259 |
| 5,384,774 | 1/1995 | Martin et al. ............................ | 370/505 |
| 5,740,173 | 4/1998 | Fiorini ..................................... | 370/394 |
| 5,841,763 | 11/1998 | Leondires et al. ...................... | 370/260 |

OTHER PUBLICATIONS

"Adaptation of H.321 Visual Telephone Terminals to B–ISDN Environments." ITU Recommendation H.321, pp. 1–16, Mar. 1996, Geneva.

R.J. Lang et al., "Packet/ Circuit Interworking for Multimedia Conferencing Services," Dec. 1994, pp. 455–459, vol. 2, XP–002071138.

H. Hessenmüller et al., "High–quality video and audio signal transmission in a broadband ISDN based on ATD," Jun. 1991, pp. 124–131, XP 000228454.

Y. Rasheed et al., "AAL1 with FEC for the Transport of CBR MPEG2 Video over ATM Networks," Mar. 24–28, 1996, pp. 529–536, XP 000621316.

*Primary Examiner*—Chi H. Pham
*Assistant Examiner*—Brenda H. Pham
*Attorney, Agent, or Firm*—Oliff & Berridge, PLC

[57] ABSTRACT

An enhanced H.321-based multipoint, multimedia conferencing service is provided over the ATM WAN interconnecting geographically dispersed H.321 terminals with a centralized H.321 MCU located within the WAN. The performance of H.321 multimedia conferencing services over the ATM WAN is improved by providing a modified WAN-based H.321 MCU which de-jiterizes cell delay variation and detects cell losses. The MCU supplies the reference clock signal that will be used by all communicating entities for synchronization, smoothes ATM cell delay variation and creates dummy bits in the case of cell losses, to create a more accurate H.221 frame. The information about the dummy bits of the H.221 frame is sent to upper layer entities to facilitate compensation at the appropriate positions of the cell/bit losses for audio and/or video traffic. The higher layer audio and video entities compensate for audio and/or video cell/bit losses with the information provided by the lower entities. In addition, intramedia and intermedia synchronization are provided for both audio and video traffic. Finally, transport protocol suits are incorporated on the top of H.221 layer to recover data cell losses or errors. Customer premises-based H.321 terminals may also employ the modified H.321 services noted above in the H.321 MCU to compensate for audio and/or video cell losses or errors for improvement of performance.

25 Claims, 8 Drawing Sheets

METHOD FOR PROVIDING ENHANCED H.321-BASED MULTIMEDIA CONFERENCING SERVICES OVER THE ATM WIDE AREA NETWORK

FIELD OF THE INVENTION

This invention relates to International Telecommunications Union (ITU) Recommendation H.321-based multimedia conferencing services over the asynchronous transfer mode (ATM) wide area network (WAN), and, more particularly, relates to a method for providing multimedia conferencing services, to a plurality of interconnected H.321 terminals, based on a modified version of H.321 which has been enhanced to compensate for lost audio and/or video cells and to recover lost data cells.

BACKGROUND OF THE INVENTION

It is critical for users to have the flexibility to participate in a multimedia conference (i.e., involving voice, video and data) and to be able to support point-to-point and multipoint configurations using an ATM wide area network based H.321 multipoint control unit (MCU). The MCU provides bridging for audio, video, and/or data for multipoint calls. Recently, the ITU developed Recommendation H.321 for multimedia conferencing in Broadband Integrated Services Digital Network (B-ISDN) environments. The H.321 recommendation describes technical specifications for adoption of the ITU Recommendation H.320 (an international standard for video-conferencing) functions using the ATM Adaptation Layer 1 (AAL-1). The H.321 terminals conforming to the H.320 specifications interwork with the same type of terminals (i.e., other H.321 terminals) accommodated in B-ISDN, as well as existing H.320 terminals accommodated in a Narrowband Integrated Services Digital Network (N-ISDN).

The H.321 system can provide for synchronization of the H.221 frame based on a common clock signal. However, the H.321 system does not provide (1) a mechanism for compensating the individual audio/video cell losses, (2) a mechanism for synchronization between audio and video signals in view of cell losses and (3) does not specify any particular transport protocols to recover cell losses or errors for data traffic (that may, for example, occur due to header errors in ATM cells or buffer overflows in network congestion).

Typically audio and video traffic may tolerate some cell losses. However, data traffic typically can not tolerate cell losses and has a stringent cell/packet loss requirement. Accordingly, there must be recovery mechanisms for lost data cells. Although timing delays typically allow data cells to be recovered through retransmission, the same is not true of audio or video cells. It is therefore necessary to provide a compensation mechanism for audio and/or video cell losses to improve performance.

An object of the present invention is to provide a method and system for modifying the H.321 specification to provide a method of compensating for lost audio and video cells, a method of maintaining audio and video synchronization, and, specific transport protocols for recovery of data cells, each of which improves performance of H.321-based multimedia conferencing services.

SUMMARY OF THE INVENTION

In accordance with the present invention, multipoint conferencing services are provided over an ATM WAN, interconnecting H.321 terminals, where the enhanced H.321 MCU function is provided within the MCU located in the ATM WAN. This enhanced service concept, which provides superior multimedia conferencing by adding new functionalities in both the H.321 MCU and the H.321 terminals, will improve the performance of the entire H.321 system in the ATM networking environment. Specifically, various algorithms (preferred algorithms are described in detail below) may be used to compensate for audio and video cell losses, while cell losses for data traffic are recovered using higher layer transport services.

A preferred cell loss compensation and synchronization algorithm is implemented within the H.321 MCU and/or H.321 terminals to compensate for cell losses and to perform synchronization between audio and video signals. Moreover, to recover cell losses for data traffic, Transmission Control Protocol (TCP) is implemented together with Internet Protocol (IP) (to take advantage of the large existing infrastructure of data applications).

The enhanced H.321-based multimedia conferencing method is based on various additions to existing H.321 functionalities: a method for cell delay variation compensation, a method for audio and video cell loss compensation and synchronization, and the addition of TCP/IP protocol suits to recover data cell losses. This method provides enhanced H.321 based multimedia conferencing services among geographically dispersed H.321 terminals interconnected via an ATM WAN. The remote H.321 terminals are logically connected to the ATM WAN-based H.321 MCU, which provides the multimedia bridging function for audio, video, and/or data. H.321 terminals can be connected to the ATM WAN using the appropriate broadband terminal interfaces as specified in the ITU Recommendation H.321.

The AAL-1 adaptation function is used by the H.321 application for the bit-streams that are being received from the H.320 layer. The AAL-1 includes a sequence number (SN) field, used to detect missing or accidentally inserted cells and to recover timing and synchronize both ends using a common clock, and, sequence number protection (SNP), which detects double errors and corrects single errors. However, H.321 terminals do not use forward error correction (FEC) or cell-loss recovery mechanisms. The only convergence function supported by H.321 terminals is the structured data transfer (SDT) mode to emulate the circuit(s) of the H.221 frame. The H.321 terminals support multimedia conferencing services over the ATM network using single or multiple virtual circuits (VCs) depending on the number of channels (e.g., B, $H_0$ and $H_{11}/H_{12}$) supported over the H.221 frame of H.320 layer.

This invention provides a method for providing enhanced H.321-based multimedia conferencing service to compensate for cell delay variations for creating the H.221 frame properly, and mechanisms to take appropriate actions by the upper layers if cell losses occur. Specifically, a preferred cell loss compensation and synchronization algorithm has been developed to compensate for audio and/or video cell losses as well as to maintain synchronization between audio and video, and, TCP/IP protocol suits have been introduced to recover from cell losses or errors for data traffic.

DETAILED DESCRIPTION

Figure 1:
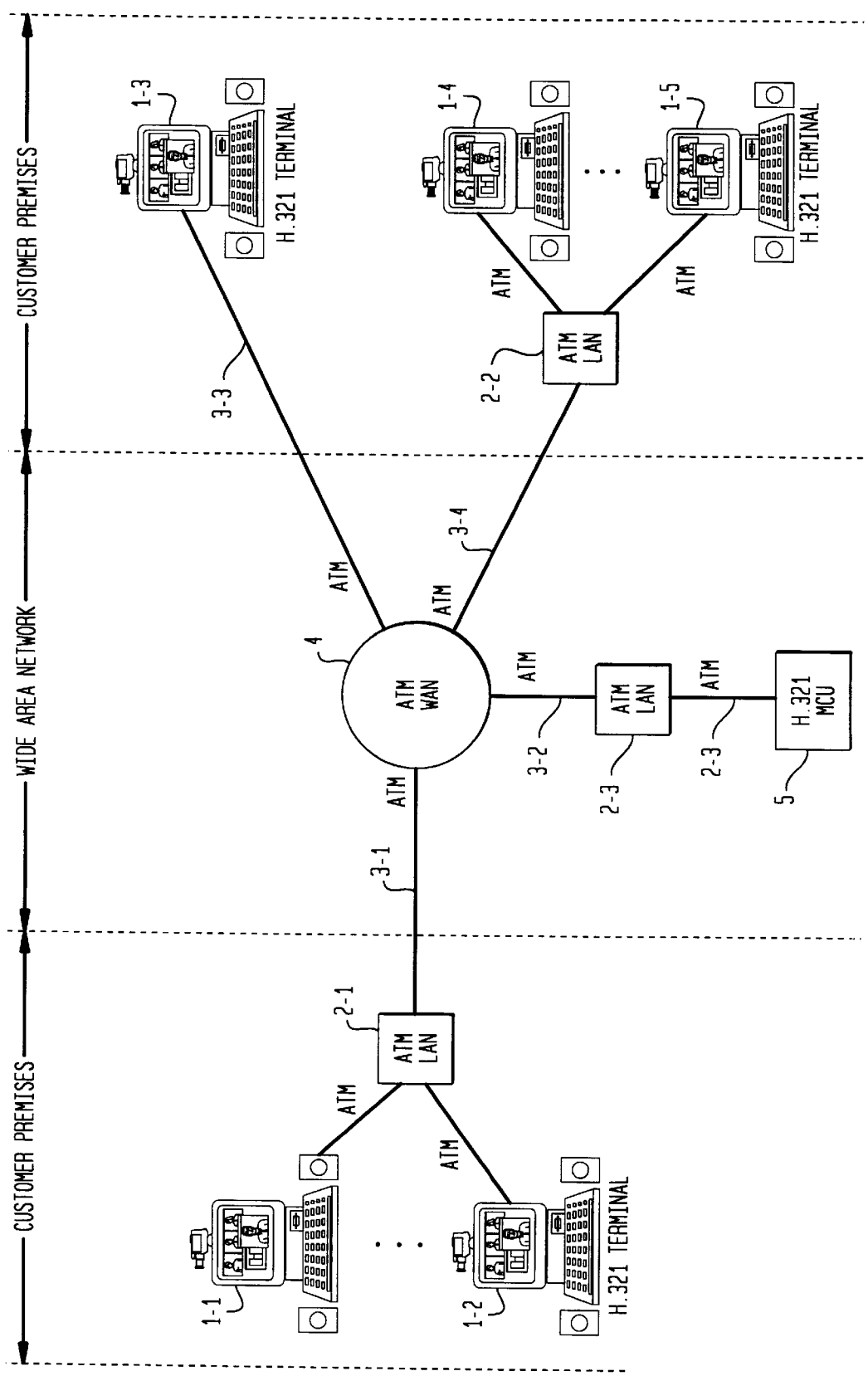
FIG. 1 illustrates one form of end-to-end network configuration for multipoint multimedia conferencing services through interconnection of H.321 terminals over an ATM WAN.

With reference to FIG. 1, a simplified overall telecommunications network configuration, in which the enhanced H.321 multipoint multimedia conferencing method and system in accordance with the present invention may be utilized, is shown. It should be recognized that the network shown in FIG. 1 may include other elements, which have been eliminated to simplify the figure and are not necessary for an understanding of the invention.

An H.321 terminal (ITU Recommendation H.321 states that there may be two possible implementations of an H.321 terminal) can be connected to the ATM WAN directly or via ATM local area network (LAN). H.321 terminal functions can be implemented within a multimedia personal computer (MPC) or a multimedia workstation (MWS). The interface between the customer premises equipment (CPE) and the ATM WAN will be a public User-to-Network-Interface (UNI), while the interface between the H.321 terminal and the customer premises equipment (i.e., ATM LAN) will be a private UNI.

A plurality of terminals (of course, an actual network would include many more terminals than those illustratively shown)1-1 and 1-2 are illustrated as being connected to common shared ATM LAN 2-1. Similarly, terminals 1-4 to 1-5 are connected to ATM LAN 2-2. An ATM LAN may have ATM switches and/or other equipment that will connect it to the ATM WAN and can be connected to different LANs within the customer premises, but once again, has not been shown in FIG. 1 for the sake of simplicity. A stand alone terminal 1-3 is shown as connected to the ATM WAN 4 directly. Each terminal 1-1, 1-2, 1-3, 1-4 and 1-5 is compliant with the H.321 protocols and generally includes a processing unit, a CRT and a camera.

A multimedia bridge, known as a Multimedia Control Unit (MCU) 5 is connected to dedicated high-speed ATM LAN 2-3 and provides a complete protocol transparency with customers premises' ATM LANs or standalone H.321 terminals. The ATM WAN-based MCU 5 compensates for cell delay variation and detects cell losses. MCU 5 communicates the cell loss information to higher layer protocol entities to take appropriate actions to compensate for cell losses (a unique cell delay variation compensation/cell loss detection (CDVC/CLD) algorithm is described further below). The audio and video bit-streams transmitted from the lower layer protocol entities to the upper layer will be properly handled to provide both intra-media and inter-media synchronization and compensate for cell losses using a unique loss compensation and synchronization (LCS) algorithm. These value-added services for improvement of performance of the multimedia conferencing are transparent to the customer premises H.321 systems.

ATM LANs 2-1, 2-2 and 2-3, and standalone H.321 terminal 1-3, are each connected to ATM WAN 4 using access links 3-1, 3-4, 3-2, and 3-3, respectively. For multipoint conferencing, the communication between H.321 terminals 1-1 through 1-5 is performed via MCU 5. All terminals will be logically connected to MCU 5, and MCU 5 provides bridging for audio, video, and/or data. The MCU 5 will control all participating H.321 terminals.

Figure 2:
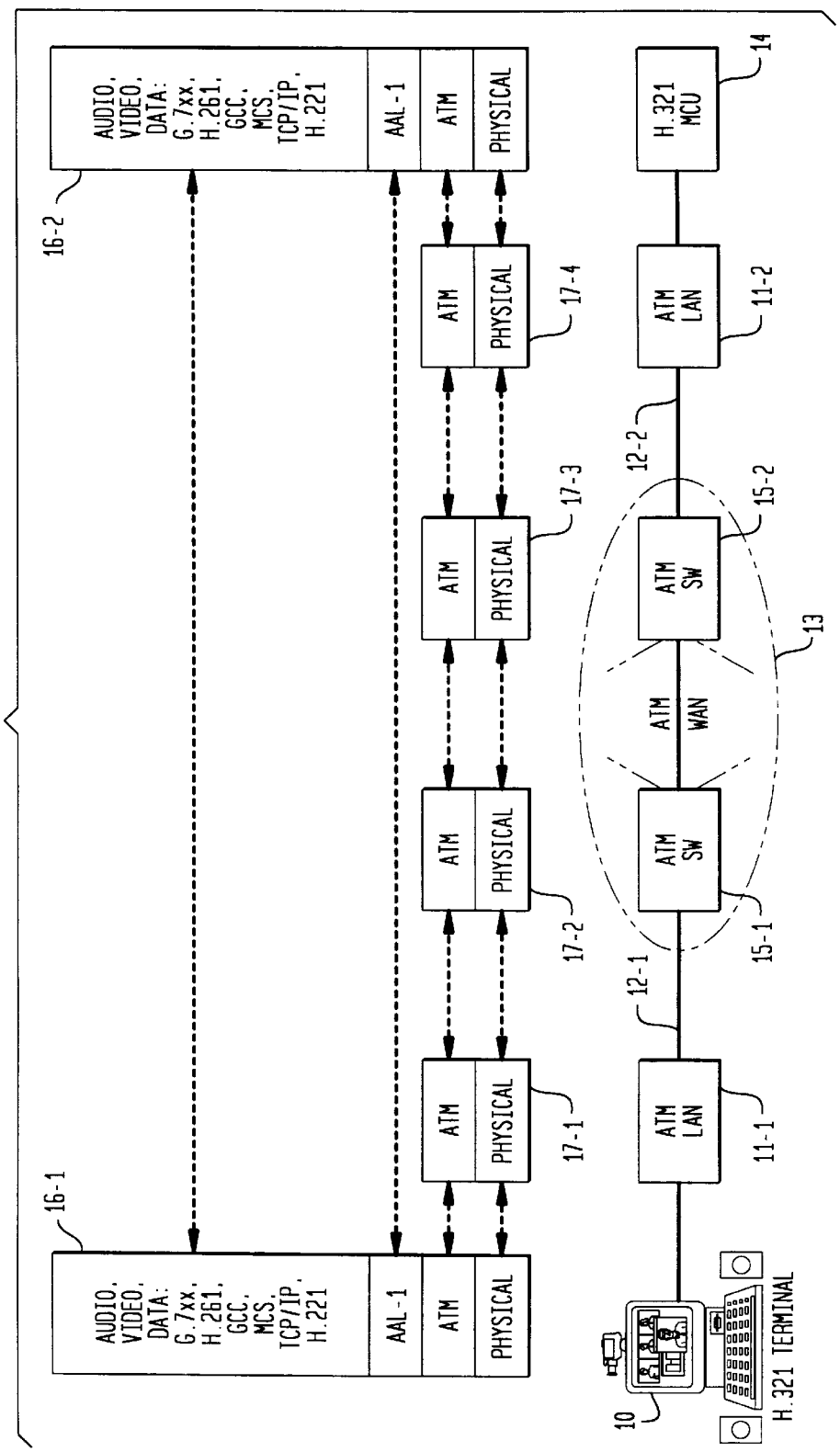
FIG. 2 depicts one form of high-level end-to-end protocol architecture for multipoint multimedia conferencing services through interconnection of H.321 terminals over an ATM WAN.

The general protocol architecture for end-to-end communication for multimedia conferencing between a customer premises-based H.321 terminal and an ATM WAN-based H.321 MCU in accordance with the invention is shown in FIG. 2. The protocol stack 16-1 of H.321 terminal 10 shows entities G.7XX, H.261, GCC, MCS, H.221, AAL-1, ATM and physical layer as specified in ITU Recommendation H.320/H.321. Protocol stack 16-2 of H.321 MCU 14 identifies the same entities as those of stack 16-1. ATM LANs (11-1 and 11-2) or ATM switches (15-1 and 15-2) communicate between H.321 terminal 10 or H.321 MCU 14 using ATM protocol. However, TCP/IP protocol suits (that are not specified in ITU Recommendation H.321) have also been introduced, on top of the H.221 layer, for both the H.321 terminal and the H.321 MCU, to recover data cell losses or errors. The addition of the TCP/IP protocol suits provides a method for more reliable data traffic transfer.

Figure 3:
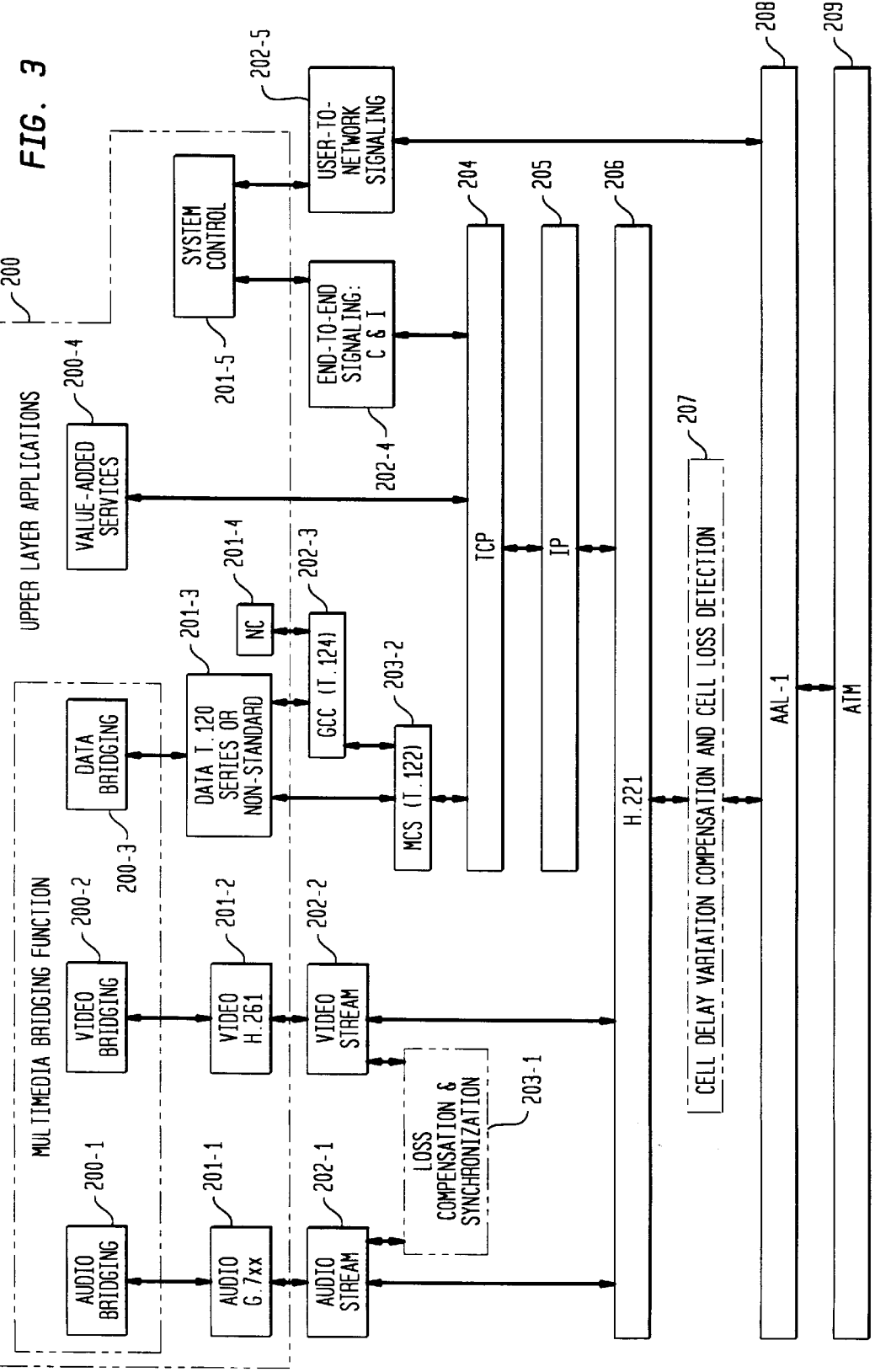
FIG. 3 illustrates enhanced H.321 multipoint control unit (MCU) protocol architecture that includes cell delay variation compensation (CDVC), cell loss detection (CLD), loss compensation and synchronization (LCS) entities and TCP/IP transport suits, in addition to other protocols.

The protocol architecture for H.321 MCU 5 is depicted in FIG. 3. The MCU functions may include bridging for audio, video, and/or data as specified in ITU Recommendations H.243/H.231 and call control services as specified in ITU Recommendation H.321. The ability of MCU 5, as modified to include loss compensation and synchronization, cell delay variation compensation and cell loss detection, and the addition of TCP 204 and IP 205, provide value added services such as address translation services, directory services, and call control services between the ATM and TCP/IP's socket layer.

In address translation service, the H.321 MCU has information regarding the TCP/IP socket layer addresses of all clients and servers stored in its database. A client that wishes to use this service communicates with the MCU to obtain the address translation service before establishment of the multimedia call. In addition, a client or a server can also register or de-register its own TCP/IP socket layer addresses in the ATM wide area network-based H.321 MCU so that this information can be provided to others by the MCU when needed.

In directory service, telephone numbers, email addresses, and other aliases that are used to identify a client or a server will also be stored in the ATM network-based H.321 MCU. Similarly, a client or a server can register or de-register its own telephone number, email addresses, or aliases with the MCU.

Both address translation and directory services may be provided by the ATM network-based H.321 MCU as a value-added feature either for a point-to-point or point-to-multipoint call. However, in call control service, the ATM wide area network-based H.321 MCU will have the capability to act a third party call control server to set up the multimedia call over the ATM wide area network in accordance with the ATM forum's third party call control standard for both point-to-point or point-to-multimedia call. The H.321 MCU will set up the call in a point-to-point fashion, to each client, acting as a root of the call in the case of point-to-multipoint call requested by a client. In the case of a point-to-point call requested by a client through the MCU, the MCU will establish the optimal path between the two source-destination path over the ATM wide area network, and the MCU may not directly be a party between the source-destination path.

In accordance with the invention, still referring to FIG. 3, cells arriving at the H.321 MCU 5, from the ATM WAN, are de-encapsulated from ATM 209 to AAL-1 208. The arriving cells are stored in a buffer 207 to "de-jiterize" the delay variation (the arrival time between packets may have significant variations known as "delay jitter"). The cell loss detection is also performed in this entity. A unique cell delay variation compensation/the cell loss detection (CDVC/CLD) algorithm (described in detail with reference to FIG. 6) has also been developed. The cell loss information is transferred from buffer 207 to a higher layer entity H.221 frame 206. The H.221 frame 206 is completed after collecting all cells belonging that frame and is then sent to various upper layer entities to perform further processing.

The bit-streams coming out of the H.221 frame 206 are separated into three entities: audio 202-1, video 202-2 and IP 205 (as a part of data bit-stream). Both intramedia and intermedia synchronization for audio 202-1 and video 202-2 bit-streams recovered from the H.221 frame are performed in an entity known as loss compensation and synchronization entity 203-1. A loss compensation and synchronization algorithm (described further below with reference to FIGS. 7 and 8) is performed to improve performance with respect to real-time traffic coming out of the lossy ATM networking environment. Once the synchronization between audio segment and video frame is performed, the bit-streams of audio 201-1 and video 201-2 are then transferred to a higher layer entity for bridging of the individual medium (audio 200-1 or video 200-2) in accordance with ITU Recommendation H.243/H.241.

Similarly, data, system control, and other bit streams are de-encapsulated from IP 205 to TCP 204 packets. TCP 204 checks if any data packets have been lost and recovers the lost data packets by sending a retransmitting request to the originator. The data bit streams are then forwarded for upper layer services. It is important to note that the TCP/IP data packets may contain the information bit-streams from several sources: data (ITU Recommendation T-120 series or non-standards) 201-3, node controller (NC) 201-4, generic conference control (GCC) 202-3, multipoint communication service (MCS) 203-2, value-added services 200-4 and control and indication (C&I) for end-to-end signaling 202-4 of system control 201-5. However, the data traffic that is being transferred using the ITU T.120 series protocols 201-3 is used for data bridging 200-3. NC 201-4 is responsible for managing the initial connection setup and also for launching local and remote applications when requested from GCC 202-3 as specified in T.124. However, the user-to-network signaling 202-5 traffic of the system control 201-5 is directly received from the AAL-1 as recommended in H.321.

It will be recognized by those skilled in the art that the steps for processing the traffic from the H.321 MCU at the ATM network correspond to those steps described above for processing traffic from the ATM network at the H.321 MCU. Accordingly, those repeated steps will not be discussed in detail.

In accordance with the invention, every conferee sets up the communication for multipoint multimedia conferencing via MCU 5. A point-to-point communication flow is set up between MCU 5 and each H.321 terminal (end station or end system) participating in the conference. Only the centralized multipoint conferencing architecture controlled by MCU 5 is described herein. Audio 200-1 and video 200-2 bridging will be performed depending on the criteria agreed upon by the participating parties.

Figure 4:
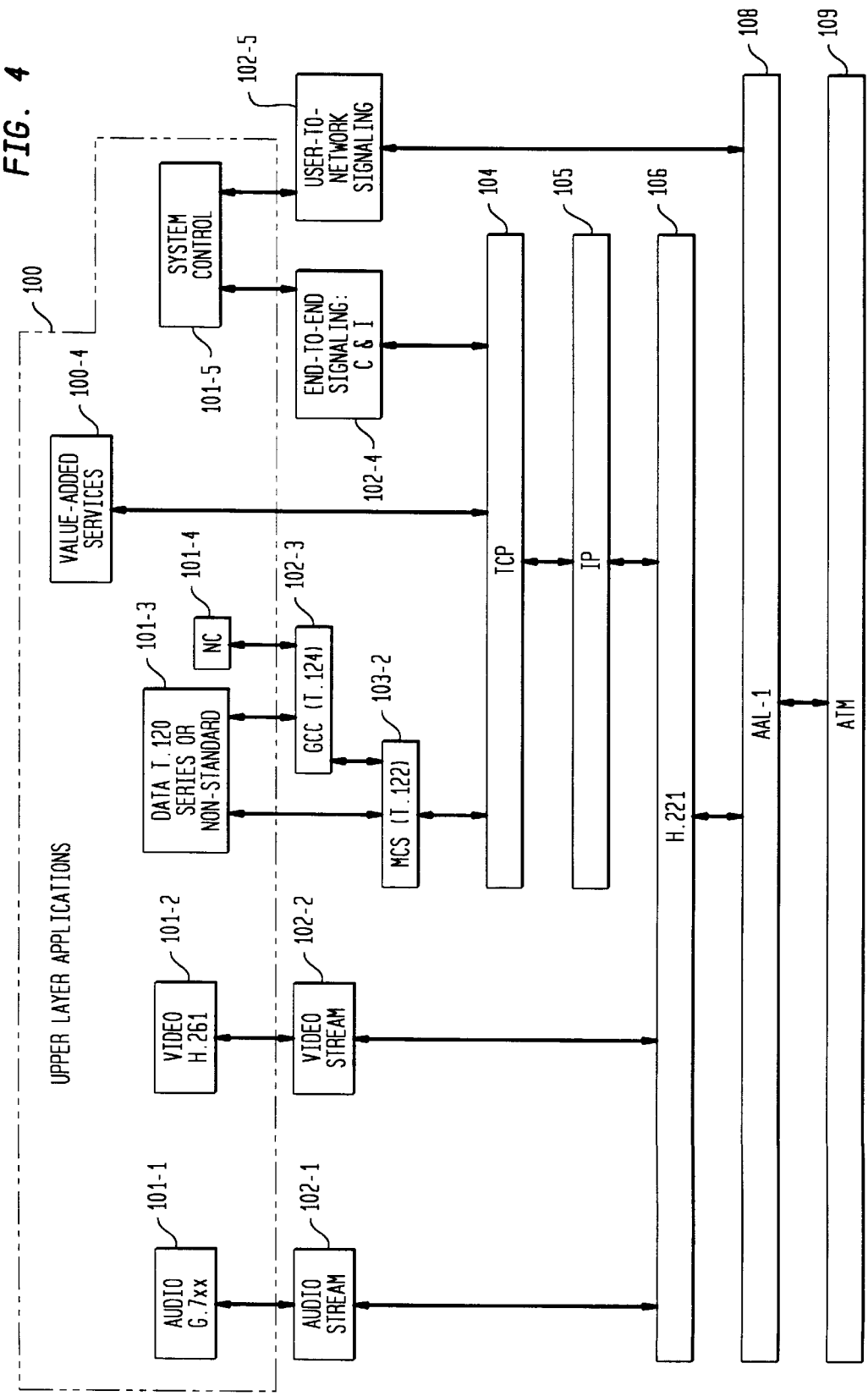
FIG. 4 illustrates enhanced H.321 terminal protocol architecture that includes TCP/IP transport suits, in addition to other protocol entities.
Figure 5:
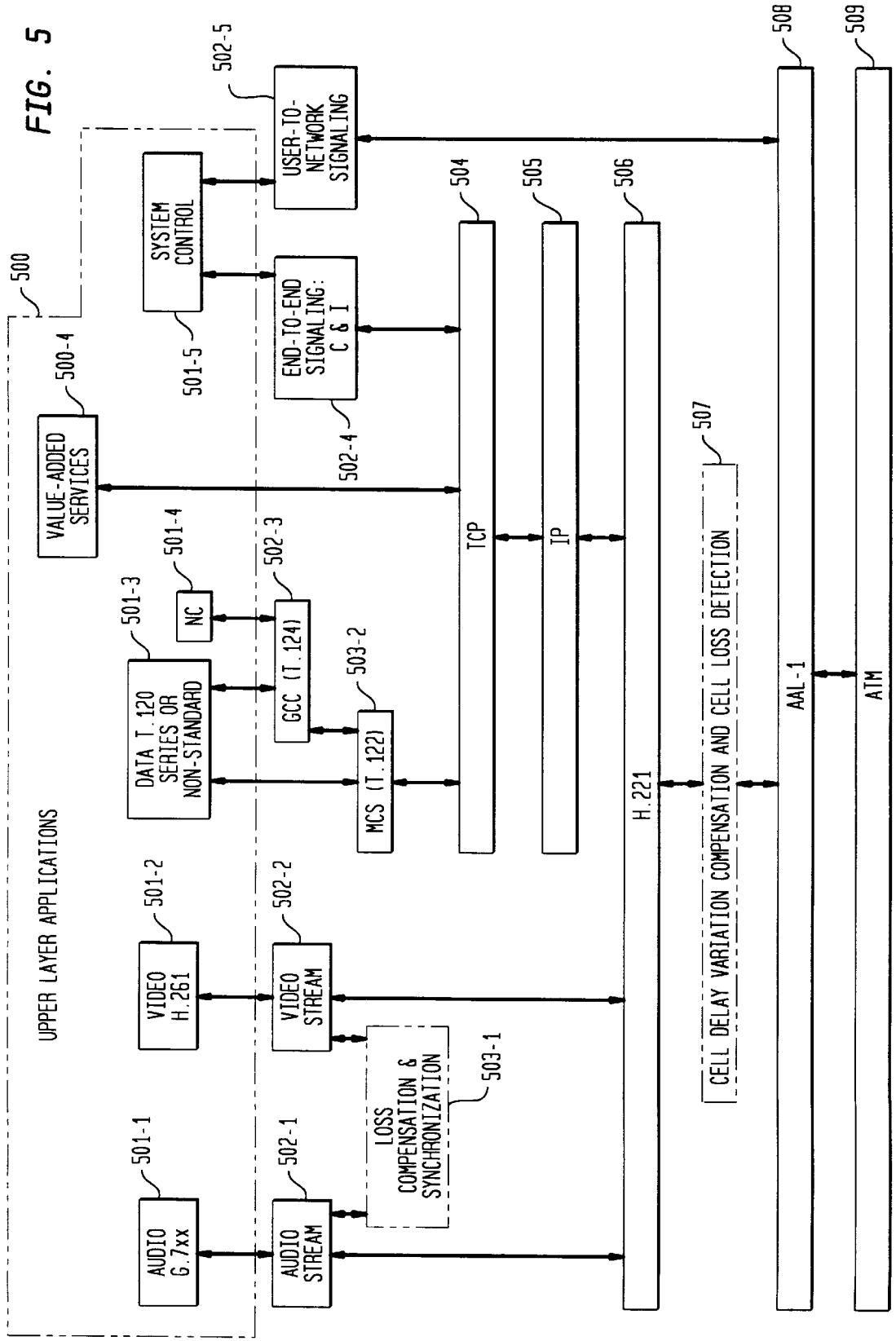
FIG. 5 illustrates enhanced H.321 terminal protocol architecture that includes cell delay variation compensation (CDVC), cell loss detection (CLD), loss and synchronization (LCS) entities and TCP/IP transport suits, in addition to other protocols.

The protocol architecture of a participating H.321 terminal can be as shown in FIG. 4 or FIG. 5. (A cell delay variation compensation and cell loss detection (CDVC/CLD) algorithm 507, and a loss compensation and synchronization (LCS) algorithm 503-1 for audio and video, are shown as being implemented in the terminal illustrated in FIG. 5 while they are omitted in the terminal illustrated in FIG. 4. If an H.321 terminal does not implement the CDVC/CLD and LCS algorithms, it must rely on the services provided by the ATM WAN and no further improvement for the quality-of-service (QOS) can be provided through cell loss detection, compensation or synchronization. Whether these algorithms are implemented by a terminal is transparent to the ATM WAN-based MCU 5.

The cells arriving at an H.321 terminal (incorporating the cell loss detection, compensation and synchronization, as in FIG. 5) from the ATM network, and, the cells arriving at the ATM network from an H.321 terminal, are processed similarly to the cells processed at the H.321 MCU 5 (described in detail above). However, once the synchronization between an audio segment and a video frame is established at the terminal, the bit-streams of audio and video are then sent out as individual media: audio 501-1 (ITU Recommendation G.series) and/or video 501-2 (ITU Recommendation H.261) for playout, storage and/or processing as required by the application. Data 501-3, system control 501-5, and other bit streams are also processed similarly as described with respect to MCU 5 in FIG. 3.

In a point-to-point multimedia call, the participating H.321 terminals can also communicate via the MCU 5 in the beginning of the call setup to provide address translation, directory services, and call control services (as specified in ITU Recommendation Q.9321) using the signaling virtual circuit (although the actual information transfer will be via the optimal path within the ATM network).

Figure 6:
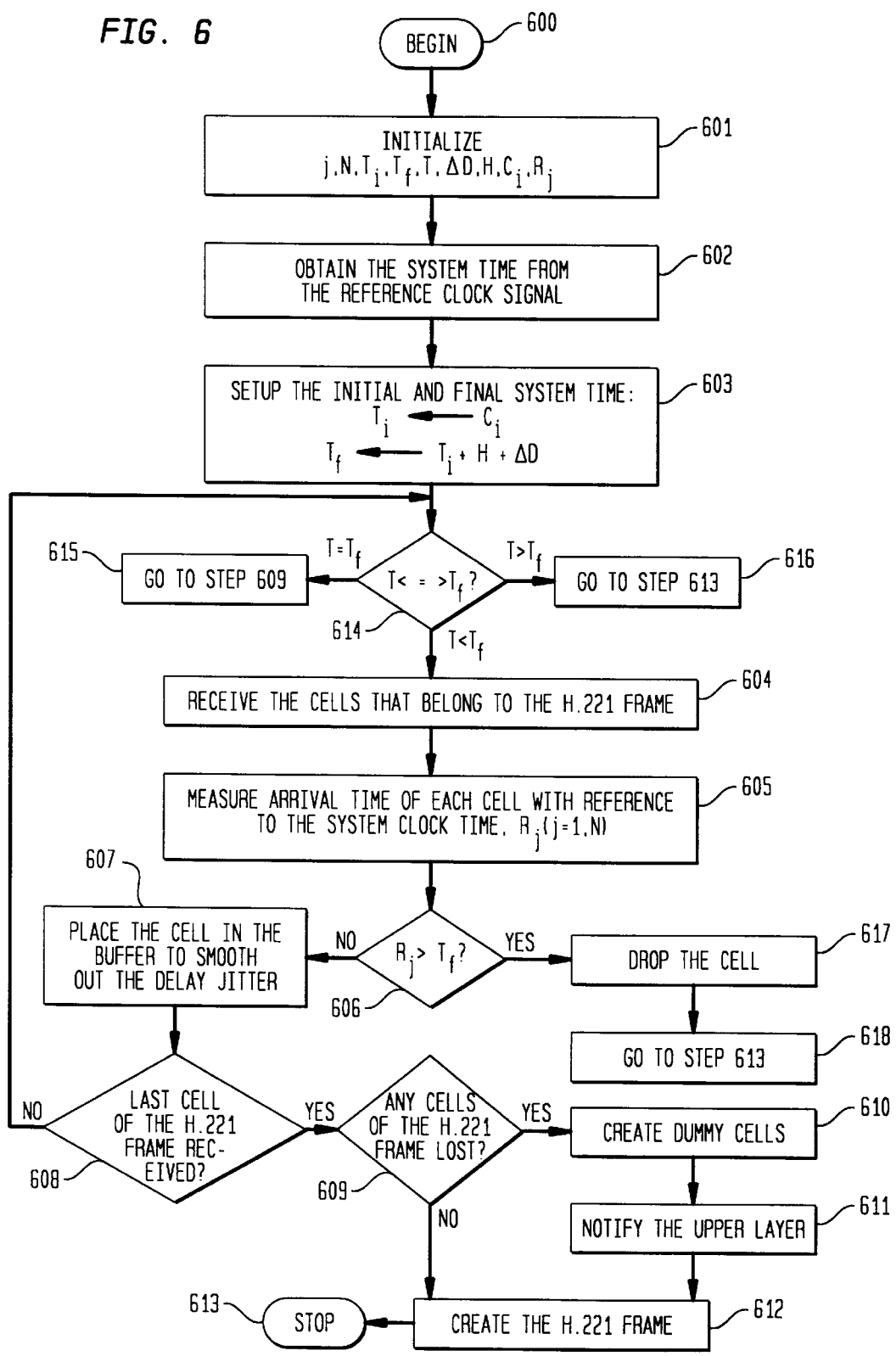
FIG. 6 is a flow diagram of one form of a cell delay variation compensation (CDVC) and cell loss detection (CLD) algorithm.

FIG. 6 depicts one preferred form of a unique Cell Delay Variation Compensation/Cell Loss Detection (CDVC/CLD) algorithm that improves the performance of H.321 based multimedia conferencing. As an example, the flow diagram illustrates the process as to traffic, that is received at an H.321 terminal from the ATM network, which may have cell losses due to errors and/or network congestion. The ATM cells received by the H.321 terminal may consist of audio, video, and/or data (text, still images and/or graphics). The process begins at step 600, and initialization is performed in step 601. The variables shown in step 601 represent the following:

j, N=Dummy variables each representing an integer $T_i$=Initial system time recorded by the entity on the top of the AAL-1

$T_f$=Final system time recorded by the entity on the top of the AAL-1

T=A variable that represents time with respect to the reference clock

ΔD=The maximum delay jitter accumulated between the source and destination path.

H=H.221 frame time $C_i$=Reference clock time recorded by the entity on the top of the AAL-1 off-setting the end-to-end delay $R_j$=Arrival time of the j-th cell with respect to the reference clock In step 602, the system time from the reference clock signal is obtained (the ATM WAN-based H.321 MCU 5 is the source of the reference clock signal). This reference clock signal is then transmitted to all participating H.321 terminals. The initial and final system time is then calculated in step 603 as follows:

$$T_i = C_i$$

$$T_f = T_i + H + \Delta D$$

There are several ways in which the initial system time, $T_i$, and the final system time, $T_f$, can be set, or the maximum accumulated delay jitter, ΔD can be calculated. As noted above in step 602, it is assumed that the ATM WAN-based MCU will send the reference clock signal to all participating terminals to use it as their reference clock. In this algorithm, the H.321 MCU (or H.321 terminal) will initiate a special signaling message within the control and indication (C&I) message sent to each participating H.321 terminal (or H.321 MCU). Receiving this signaling message, the participating terminal (or MCU) will send a response to the MCU (or terminal) containing the processing time of the message within the terminal (or MCU). The MCU (or terminal) will note the round trip delay for each terminal (or MCU). In this way, the MCU (or terminal) can measure the round trip delay with reference to the reference clock signal sent from the ATM WAN-based MCU. The value $C_i$ is set in such a way that offsets the maximum end-to-end delay from the furthest end with reference to the reference clock.

The value H is set equal to a single H.221 frame time. The H.221 frame time and the corresponding total number of bits in a given frame are set at the time of the call setup. The number of bits in a given frame also determines the total number of ATM cells that are being formed for a given H.221 frame. The sequence number of all ATM cells of the H.221 frame is provided according to the scheme mentioned in ITU Recommendation H.321. The maximum cell delay jitter, ΔD is a variable value and depends on the behavior of the ATM network that lies between the source destination path of the communicating end systems (H321 terminals/ MCU). However, a value of ΔD can be estimated based on the quality-of-service (QOS) parameters that are negotiated at the time of call setup. The MCU (or terminal) will then begin monitoring whether the maximum limit of the cell delay jitter value has been exceeded and can adjust this value dynamically if there is a minor variation from the negotiated value. However, there will be a further negotiation between the MCU and the participating terminals if the value of ΔD substantially exceeds, or the cell loss rate significantly increases, over that of the negotiated threshold value.

Following step 603, in step 614, the MCU (or terminal) begins measuring the time, T, constantly, in order to create the H.221 frame. The ATM cells will be received as long as T is less than $T_f$, in which case the process proceeds to step 604. If T is equal to $T_f$, the process proceeds to step 609 (as illustrated in step 615) to examine whether any cells of the H.221 frame have been lost. If T is greater than $T_f$ (i.e., if the time with respect to the reference clock exceeds the final system time recorded by the entity on the top of the AAL-1) the process proceeds to step 613 (as illustrated in step 616) without forming the H.221 frame (note that while this is a very unlikely event, since T is constantly monitored, it has been included as a precaution).

Therefore, when T is less than $T_f$, in step 604 a cell of the H.221 frame is collected and the arrival time of a cell ($R_j$, j=1, N) is measured in step 605. In step 606, the arrival time, $R_j$ of a given cell is compared with the system final time, $T_f$. If $R_j$ is less than $T_f$, the cell is placed in a buffer to smooth out the delay jitter (step 607) and the process proceeds to step 608. However, if $R_j$ is greater than $T_f$, the cell is dropped (step 617) and the process proceeds to step 613 (as shown in step 618) without forming the H.221 frame (it is unlikely that $R_j$ will exceed $T_f$, since the time is constantly monitored in step 614, however, this step has been included to increase the reliability in detecting cell losses so that higher layers can take appropriate actions).

Step 608 examines whether the last cell of the of the H.221 frame has been received based on the sequence number of the receiving cell. If the last cell has not been received, the process returns to step 614 to repeat the process as described above. If a determination is made in step 608 that the cell containing the last sequence number of the cell of the H.221 frame has been received, the process proceeds to step 609, which determines if any cells of the H.221 frame have been lost. If no cells have been lost, the H.221 frame is formed in step 612 and the process is complete (step 613). However, if a determination is made in step 609 that cells have been lost, in step 610 dummy cells are created and the upper layers are notified in step 611. The process then continues to step 612 where the H.221 frame is created and the process is completed (step 613).

Figure 7:
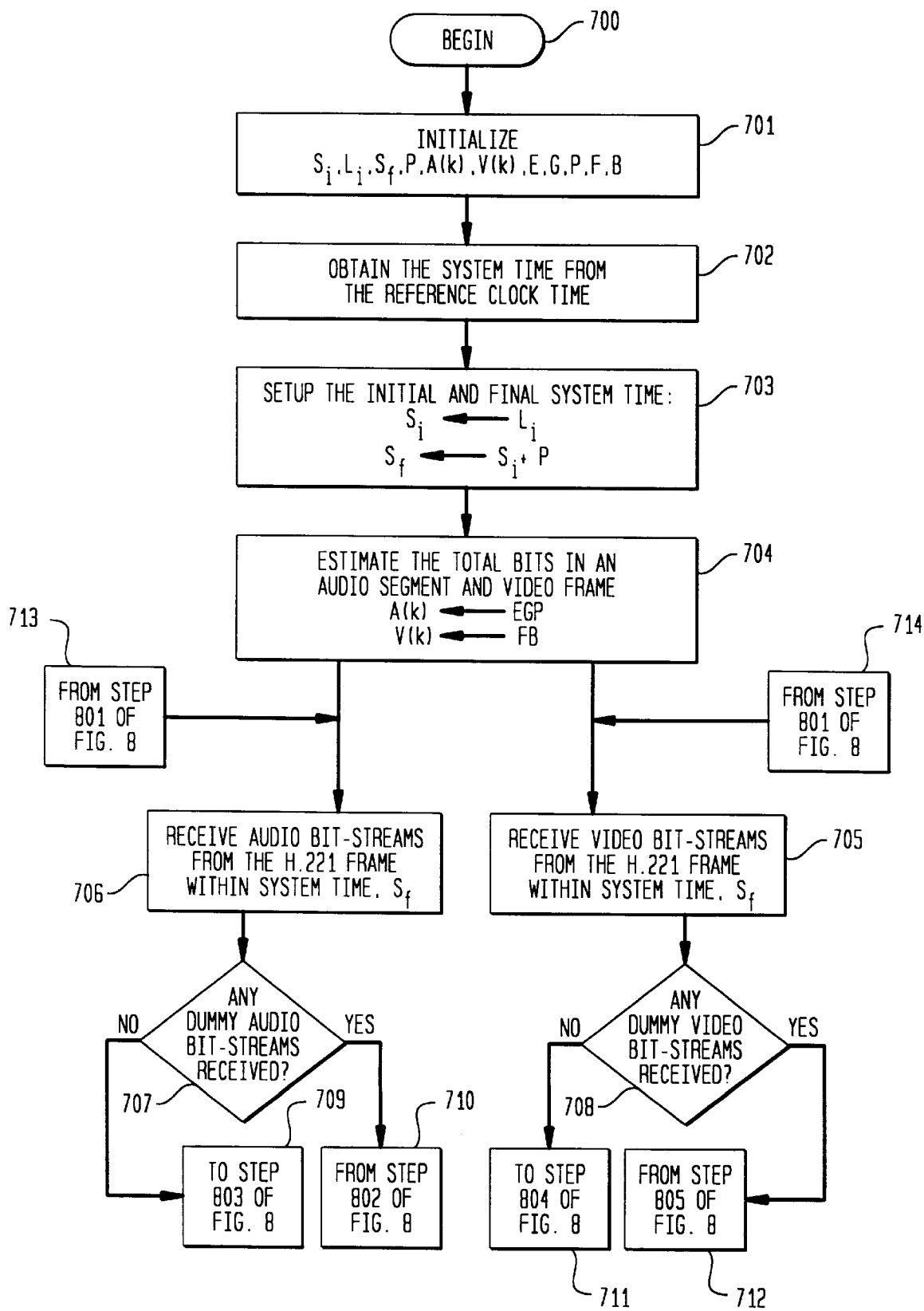
FIGS. 7 and 8 are flow diagrams of one form of a loss compensation and synchronization (LCS) algorithm to provide intramedia and intermedia synchronization for improvement of performance of real-time audio and video traffic (i.e., to maintain lip-synchronization).
Figure 8:
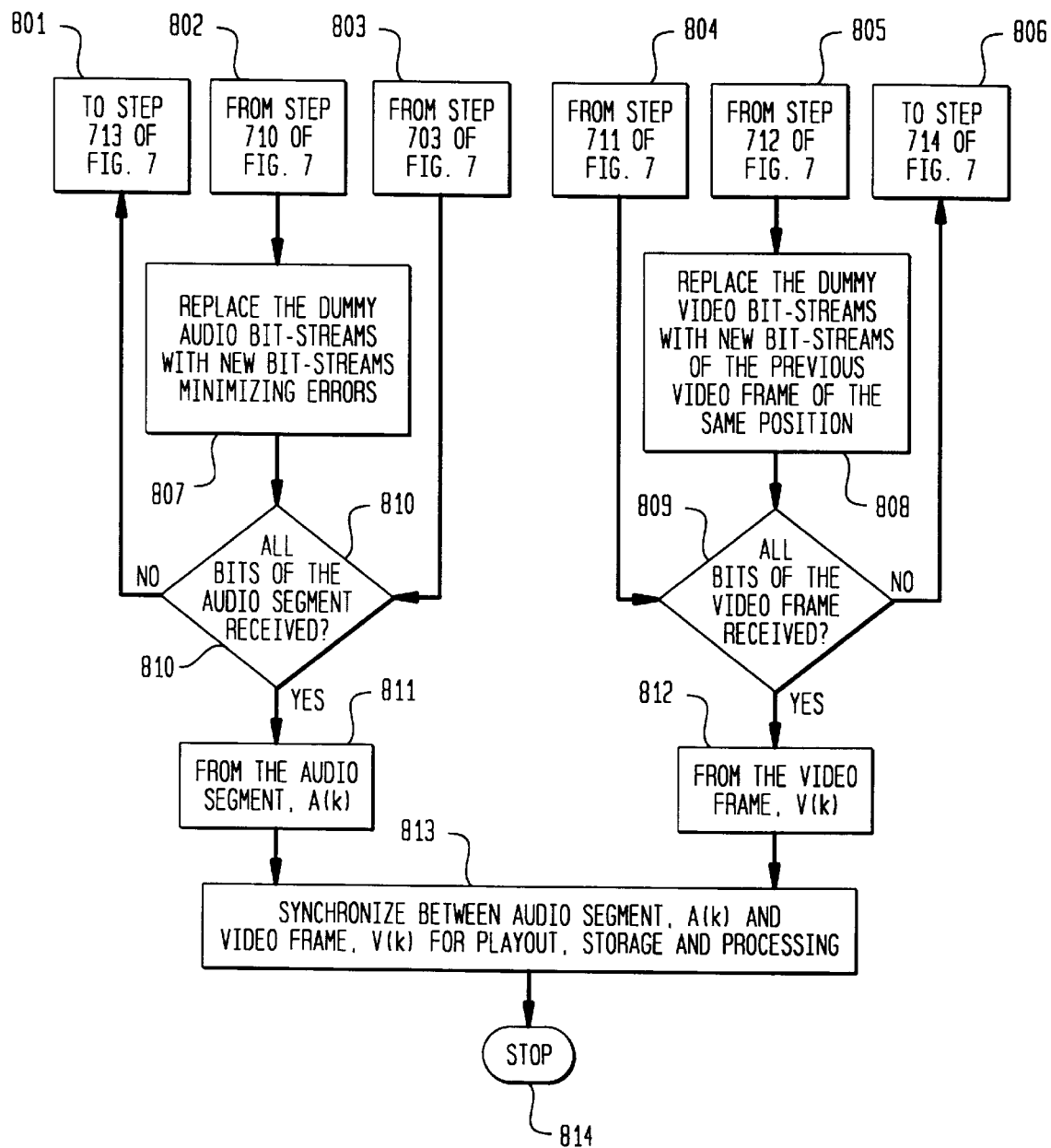

FIGS. 7 and 8 describe one form of a unique algorithm that improves the performance of the real-time audio and video traffic that are being received from the ATM network via H.221 frame, since an ATM network may have cell losses due to errors and/or network congestion. The CDVC algorithm described earlier shows how the H.221 frame is formed. The H.221 frame may contain dummy bits as well. The upper layer entities contain information as to which of the bits of the H.221 frame are dummy bits. The H.221 frame contains the bits for audio, video and data (applications and system control). If the data bits are dummy bits, TCP protocol (as shown in FIGS. 3, 4, and 5) can request that the source retransmit the data, and the receiving entity can recover from errors. Although conventional methods may be used for the actual recovery mechanism of data traffic, the present invention, partially through the addition of the TCP/IP protocols suits on the top of the H.221 frame/AAL-1/ATM (FIGS. 3, 4, and 5), enables those methods to be utilized.

The dummy bits of the H.221 frame that is a part of audio and/or video traffic must be re-created through compensation while minimizing errors, since audio or video traffic cannot be recovered using retransmission mechanisms. In addition, intra- and inter-media synchronization for both audio and video traffic must be maintained. One form of a unique LCS algorithm has been developed which will improve the performance of the real-time audio and video traffic through compensation of errors or losses and through maintaining intramedia and intermedia synchronization.

The process for the LCS algorithm begins at step 700 (FIG. 7), and initialization is performed in step 701. The variables shown in step 701 represent the following:

k=Dummy variable representing an integer $S_i$=Initial system time recorded by the entity on the top of the H.221 frame $L_i$=Reference clock time recorded by the entity on the top of the H.221 frame off-setting the end-to-end delay $S_f$=Final system time recorded by the entity on the top of the H.221 frame A(k)=k-th audio segment
V(k)=k-th video frame
E=Total number of audio samples per second
G=Total number bits per audio sample
P=Playout time
F=Total number of video frames per second
B=Total number of bits per video frame In step 702, the system time from the reference clock is obtained. The reference clock signal is sent from the ATM WAN-based MCU to the participating H.321 terminals and all terminals lock their respective clocks to this reference time. The CLS algorithm is used by the ATM WAN-based H.221 MCU to improve performance of the networking environment—however, it is optional for the H.221 terminal to utilize the algorithm. The MCU will implement the algorithm irrespective of whether an H.321 terminal implements the algorithm. The use of this CLS algorithm is transparent to the communicating entities (H.321 terminals/MCU). In step 703, the initial and final system time will be set as follows:

$S=L_i$ $S_f=S_j+P$

In step 704, the total bits in a audio segment and video frame are calculated as follows:

$A(k)=EGP$ $V(k)=FB$

From step 704, the process is separated into two parallel parts: one for audio (step 706) and another for video (step 705).

In step 706, all the audio bit-streams from a H.221 frame that are received within the final system time, $S_f$, are collected, and the process proceeds to step 707. In step 707, it is determined whether any dummy audio bits have been received. If so, the process proceeds to step 802 of FIG. 8 (as illustrated in step 710 of FIG. 7 and step 802 of FIG. 8). Step 802 continues to step 807, where the dummy audio bits are replaced with new audio bit-streams with minimizing errors (the creation of new audio bit-streams replacing the dummy bits is conventional and is not a part of the invention). The process then continues to step 810. If it is determined in step 707 that dummy audio bits have not been received, the process continues to step 810 directly (as illustrated in step 709 of FIG. 7 and step 803 of FIG. 8). In step 810 of FIG. 8, it is determined whether all of the bits of the audio segment have been received. If not, the process returns to step 706 of FIG. 7 (as illustrated in step 801 of FIG. 8 and step 713 of FIG. 7). However, if a determination is made in step 810 that all of the bits of the audio segment have been received, the process proceeds to step 811 to form the audio segment A(k).

The video bit stream is processed similarly to the audio described above. Specifically, in step 705 all of the video bit-streams from a H.221 frame that are received within the final system time, $S_f$, are collected and the process proceeds to step 708. In step 708, it is determined whether any dummy video bits have been received. If dummy video bits have been received, the process proceeds to step 808 of FIG. 8 (as illustrated in step 712 of FIG. 7 and step 805 of FIG. 8). In step 808 the dummy video bits are replaced with the bit-streams of the previous video frame of the same position. The process then proceeds to step 809. However, if it is determined in step 708 that no dummy video bits have been received, the process continues directly to step 809 (as illustrated in step 711 of FIG. 7 and step 804 of FIG. 8). In step 809 of FIG. 8, it is determined whether all bits of the video frame have been received. If they have not been received, the process returns to step 705 (as illustrated in step 806 of FIG. 8 and step 714 of FIG. 7). However, if it is determined in step 809 that all bits of the video frame have been received, the process continues to step 812 to form the video frame.

After the audio segment A(k) and the video frame V(k) have been formed in steps 811 and 812, respectively, they are then combined in step 813 and the synchronization between the audio segment and video frame is performed for playout, storage or processing as needed by the upper layer applications.

It should be noted that although a preferred embodiment of the invention is described in detail above, various modifications could also be incorporated into the disclosed application without departing from the spirit and scope of the invention.

What is claimed is:

1. A method for providing improved H.321-based multipoint multimedia conferencing services to a dispersed plurality of terminals interconnected by an ATM wide area network (WAN), the WAN having a modified H.321 MCU, said method comprising the steps of:

receiving cells at the AAL-1 layer of the modified H.321 MCU protocol, the modified H.321 MCU protocol utilizing a modified Recommendation H.321 protocol;

storing the cells in a buffer;

determining if any cells have been lost;

creating a corresponding number of dummy cells if a determination is made in said determining step that cells have been lost;

transferring cell loss information to upper layers;

forming an H.221 frame.

2. The method of claim 1 wherein the modified H.321 MCU acts as a common central clock signal source to synchronize all participating terminals at the dispersed plurality of locations.

3. The method of claim 2, wherein the modified H.321 MCU compensates for lost audio and video cells using the cell loss information transferred in said transferring step to upper layers, comprising the additional steps of:

receiving video bit streams from the H.221 frame;

determining if any dummy video cells are included in the H.221 frame, wherein, if a determination is made that dummy bits are included, the dummy video bits are replaced with new video bit-streams, determining if all bits of the video frame have been received, wherein if all bits of the video frame have been received, the video frame is formed;

receiving audio bit streams from the H.221 frame;

determining if any dummy audio bits are included in the H.221 frame, wherein, if a determination is made that dummy bits are included, the dummy audio bits are replaced with new audio bit-streams;

determining if all bits of the audio frame have been received, wherein if all bits of the audio frame have been received, the audio segment is formed; and synchronizing the video frame and the audio segment.

4. The method of claim 3, wherein the modified H.321 MCU provides synchronization between the audio segment and the video frame.

5. The method of claim 2 wherein the modified H.321 MCU provides TCP and IP protocol suits on the top of an H.221 layer of an H.320 protocol entity.

6. The method of claim 5 wherein the TCP and IP protocol suits provide means to recover from data cell/packet losses or errors transferred in said transferring step.

7. The method of claim 6 wherein the modified H.321 MCU provides address translation services between the ATM WAN and a TCP and IP socket layer.

8. The method of claim 1 wherein the modified H.321 MCU may participate in a point-to-point call between terminals at call setup to provide address translation services, directory services, and call control services using a signaling virtual circuit.

9. The method of claim 1, wherein an actual information transfer occurs via an optimal path within the ATM WAN.

10. A method for providing improved H.321-based multipoint multimedia conferencing services to a dispersed plurality of locations interconnected by an ATM wide area network (WAN), the WAN having a modified H.321 MCU, said method comprising the steps of:

receiving audio bit streams into the modified H.321 MCU from an H.221 frame;

determining if any dummy audio bits are included in the H.221 frame, wherein, if a determination is made in said determining step that dummy bits are included, the dummy audio bits are replaced with new audio bit-streams, and determining if all bits of the audio frame have been received, wherein if all bits of the audio frame have been received, the audio segment is formed.

11. The method of claim 10 wherein the modified H.321 MCU acts as a common central clock signal source to synchronize all participating terminals at the dispersed plurality of locations.

12. A method for providing improved H.321-based multipoint multimedia conferencing services to a dispersed plurality of locations interconnected by an ATM wide area network (WAN), the WAN having a modified H.321 MCU, said method comprising the steps of:

receiving video bit streams into the modified H.321 from an H.221 frame;

determining if any dummy video bits are included in the H.221 frame, wherein, if a determination is made in said determining step that dummy bits are included, the dummy video bits are replaced with new video bit-streams, and determining if all bits of the video frame have been received, wherein if all bits of the video frame have been received, the video frame is formed.

13. The method of claim 12 wherein the modified H.321 MCU acts as a common central clock signal source to synchronize all participating terminals at the dispersed plurality of locations.

14. A method for providing improved H.321-based multipoint multimedia conferencing services to a dispersed plurality of locations interconnected by an ATM wide area network (WAN), the WAN having an H.321 MCU, said method comprising the steps of:

receiving video bit streams into the modified H.321 MCU from an H.221 frame;

determining if any dummy video bits are included in the H.221 frame, wherein, if a determination is made in said determining step that dummy bits are included, the dummy video bits are replaced with new video bit-streams, determining if all bits of the video frame have been received, wherein if all bits of the video frame have been received, the video frame is formed;

receiving audio bit streams from an H.221 frame;

determining if any dummy audio bits are included in the H.221 frame, wherein, if a determination is made in said determining step that dummy bits are included, the dummy audio bits are replaced with new audio bit-streams;

determining if all bits of the audio frame have been received, wherein if all bits of the audio frame have been received, the audio segment is formed; and synchronizing the video frame and the audio segment.

15. The method of claim 14 wherein the modified H.321 MCU acts as a common central clock signal source to synchronize all participating terminals at the dispersed plurality of locations.

16. The method of claim 14 wherein the modified H.321 MCU provides TCP and IP protocol suits on the top of an H.221 layer of an H.320 protocol entity.

17. The method of claim 16 wherein the TCP and IP protocol suits provide means to recover from data cell/packet losses or errors transferred in said transferring step.

18. A method for providing improved H.321-based multipoint multimedia conferencing services to a dispersed plurality of locations interconnected by an ATM wide area network (WAN), the WAN having a modified H.321 MCU, said method comprising the steps of:

providing TCP and IP protocol suits on the top of an H.221 layer of an H.320 protocol entity for the modified H.321 MCU, the modified H.321 MCU utilizing a modified Recommendation H.321 protocol, wherein the TCP and IP protocol suits provide means to recover from data cell/packet losses or errors.

19. The method of claim 18, wherein the modified H.321 MCU acts as a common central clock signal source to synchronize all participating terminals at the dispersed plurality of locations.

20. A method of providing improved H.321-based multipoint multimedia conferencing services to a dispersed plurality of terminals, interconnected by an ATM wide area network (WAN) having a modified H.321 MCU, wherein the plurality of terminals each include an H.321 terminal modified such that each terminal may perform a method comprising the steps of:

receiving cells at an AAL-1 layer of the modified H.321 MCU protocol, the modified H.321 MCU protocol utilizing a modified Recommendation H.321 protocol;

storing the cells in a buffer;

determining if any cells have been lost;

creating a corresponding number of dummy cells if a determination is made in said determining step that cells have been lost;

transferring cell loss information to upper layers;

forming an H.221 frame.

21. The method of claim 20 wherein the modified H.321 MCU acts as a common central clock signal source to synchronize all participating terminals at the dispersed plurality of locations.

22. The method of claim 21, wherein each modified H.321 terminal compensates for lost audio and video cells using the cell loss information transferred in said transferring step to upper layers, comprising the additional steps of:

receiving video bit streams from the H.221 frame;

determining if any dummy video cells are included in the H.221 frame, wherein, if a determination is made that dummy bits are included, the dummy video bits are replaced with new video bit-streams, determining if all bits of the video frame have been received, wherein if all bits of the video frame have been received, the video frame is formed;

receiving audio bit streams from the H.221 frame;

determining if any dummy audio bits are included in the H.221 frame, wherein, if a determination is made that dummy bits are included, the dummy audio bits are replaced with new audio bit-streams;

determining if all bits of the audio frame have been received, wherein if all bits of the audio frame have been received, the audio segment is formed; and synchronizing the video frame and the audio segment.

23. The method of claim 22, wherein each modified H.321 terminal provides synchronization between the audio segment and the video frame.

24. The method of claim 22 wherein each modified H.321 terminal provides TCP and IP protocol suits on the top of an H.221 layer of an H.320 protocol entity, wherein the TCP and IP protocol suits provide means to recover from data cell/packet losses or errors transferred in said transferring step.

25. The method of claim 7, wherein the address translation services between the ATM WAN and the TCP and IP socket layer allows registration or de-registration of TCP/IP socket layer addresses.

* * * * *